US008751026B2

(12) United States Patent
Sato et al.

(10) Patent No.: US 8,751,026 B2
(45) Date of Patent: Jun. 10, 2014

(54) AUDIO DATA RECEIVING APPARATUS, AUDIO DATA RECEIVING METHOD, AND AUDIO DATA TRANSMISSION AND RECEIVING SYSTEM

(75) Inventors: Teppei Sato, Kanagawa (JP); Kenji Shiba, Tokyo (JP); Satoru Suzuki, Tokyo (JP)

(73) Assignee: Sony Corporation (JP)

( * ) Notice: Subject to any disclaimer, the term of this patent is extended or adjusted under 35 U.S.C. 154(b) by 464 days.

(21) Appl. No.: 12/800,330

(22) Filed: May 13, 2010

(65) Prior Publication Data

US 2010/0316238 A1    Dec. 16, 2010

(30) Foreign Application Priority Data

Jun. 11, 2009 (JP) ................. P2009-140404

(51) Int. Cl.
*G11B 20/00* (2006.01)
*H04L 7/00* (2006.01)
*H04R 5/02* (2006.01)

(52) U.S. Cl.
USPC ............................ 700/94; 375/354; 381/300

(58) Field of Classification Search
CPC .............. G11B 20/10009; G11B 20/10231; G11B 20/1024; G11B 20/10398; G11B 20/10425; G11B 20/10527; H04L 7/0016; H04L 7/0025; H04L 7/0029; H04L 7/005
USPC ........... 327/144; 381/300; 386/200; 370/316; 455/39, 73; 700/94; 375/354–355, 376
See application file for complete search history.

(56) References Cited

U.S. PATENT DOCUMENTS

| | | | | |
|---|---|---|---|---|
| 5,946,343 | A * | 8/1999 | Schotz et al. | 375/141 |
| 5,999,580 | A * | 12/1999 | Sakoda et al. | 375/354 |
| 2006/0023811 | A1 * | 2/2006 | Yoon | 375/326 |
| 2006/0083342 | A1 * | 4/2006 | Ishida | 375/372 |
| 2006/0247810 | A1 * | 11/2006 | Risbo et al. | 700/94 |
| 2009/0058477 | A1 * | 3/2009 | Curtis | 327/145 |
| 2010/0086093 | A1 * | 4/2010 | Sheet | 375/376 |
| 2011/0019788 | A1 * | 1/2011 | Shibata | 375/371 |

FOREIGN PATENT DOCUMENTS

JP    2002-268662 A    9/2002

* cited by examiner

*Primary Examiner* — Duc Nguyen
*Assistant Examiner* — Alexander Eljaiek
(74) *Attorney, Agent, or Firm* — Lerner, David, Littenberg, Krumholz & Mentlik, LLP

(57) ABSTRACT

An audio data receiving apparatus includes a receiving unit configured to receive audio data sampled in accordance with a first clock signal; a synchronization unit configured to generate a second clock signal that is synchronized with the first clock signal by extracting clock components contained in the audio data; a demodulator configured to demodulate the audio data in accordance with the second clock signal; an oversampling unit configured to oversample the audio data demodulated by the demodulator by using a frequency higher than a frequency of the second clock signal; a clock generator configured to generate a third clock signal having a frequency nearly equal to the first clock signal; and a data output unit configured to output the audio data oversampled by the oversampling unit in accordance with the third clock signal generated by the clock generator.

3 Claims, 8 Drawing Sheets

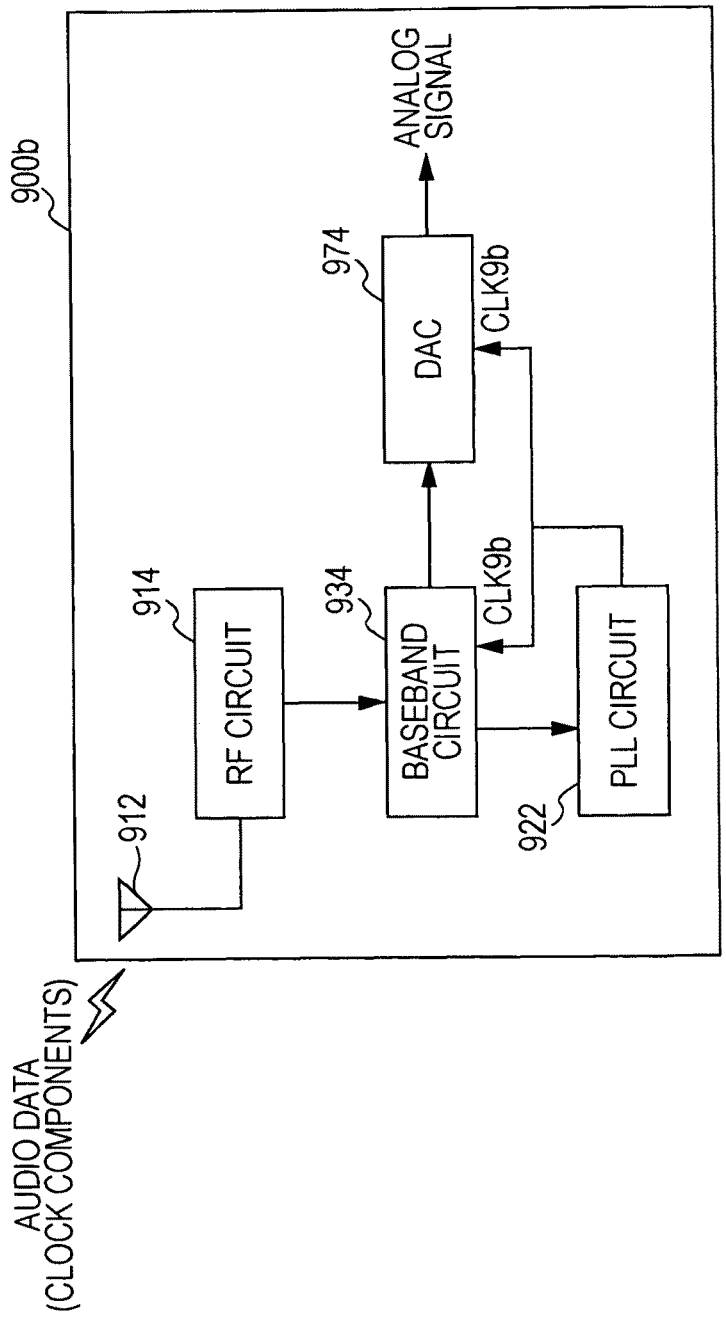

AUDIO DATA RECEIVING APPARATUS, AUDIO DATA RECEIVING METHOD, AND AUDIO DATA TRANSMISSION AND RECEIVING SYSTEM

CROSS-REFERENCE TO RELATED APPLICATION

The present application claims priority from Japanese Patent Application No. JP 2009-140404 filed in the Japanese Patent Office on Jun. 11, 2009, the entire content of which is incorporated herein by reference.

BACKGROUND OF THE INVENTION

1. Field of the Invention

The present invention relates to an audio data receiving apparatus, an audio data receiving method, and an audio data transmission and receiving system.

2. Description of the Related Art

In recent years, as information transmission technology has become developed, a technology for transmitting audio data among a plurality of apparatuses has become increasingly used. For example, in home theater systems, attempts have been made to increase the degree of freedom of a layout of a speaker or the like by connecting a transmission apparatus that transmits audio data to a receiving apparatus that receives audio data, such as a speaker, in a wireless manner.

As described above, in a case where audio data is to be transmitted among a plurality of apparatuses and processed, as a technique for making a clock used for processing audio data on a receiving side match a sampling frequency on a transmission side, mainly, a technique of one of a synchronous mode and an asynchronous mode is used. The synchronous mode is a mode in which a transmission apparatus causes clock components corresponding to a sampling frequency to be contained in audio data and transmits the audio data, and a receiving apparatus processes the audio data in accordance with the received clock components (see, for example, Japanese Unexamined Patent Application Publication No. 2002-268662). The asynchronous mode is a mode in which clock components transmitted from a transmission apparatus are not used, and a receiving apparatus generates a clock having a frequency equal to a sampling frequency in a transmission apparatus, and processes audio data.

SUMMARY OF THE INVENTION

However, in the synchronous mode, there is a case in which a clock on a receiving side becomes unstable due to the performance of a phase-locked loop (PLL) circuit that extracts clock components from a received signal and due to influence of noise contained in the received signal, and the quality of reproduced audio is decreased. Furthermore, in the asynchronous mode, there is a case in which as a result of a deviation occurring between the clock on a transmission side and the clock on a receiving side, asynchronous noise occurs.

Accordingly, it is desirable to provide a new and improved audio data receiving apparatus, audio data receiving method, and audio data transmission and receiving system that are capable of suppressing a decrease in the quality of audio on a receiving side in a case where audio data is to be transmitted among a plurality of apparatuses.

According to an embodiment of the present invention, there is provided an audio data receiving apparatus including: a receiving unit configured to receive audio data sampled in accordance with a first clock signal; a synchronization unit configured to generate a second clock signal that is synchronized with the first clock signal by extracting clock components contained in the audio data; a demodulator configured to demodulate the audio data in accordance with the second clock signal; an oversampling unit configured to oversample the audio data demodulated by the demodulator by using a frequency higher than a frequency of the second clock signal; a clock generator configured to generate a third clock signal having a frequency nearly equal to a frequency of the first clock signal; and a data output unit configured to output the audio data oversampled by the oversampling unit in accordance with the third clock signal generated by the clock generator.

With such a configuration, the received audio data is demodulated in accordance with a second clock signal having a frequency synchronized with the sampling frequency of the audio data. Then, the demodulated audio data is oversampled using a frequency higher than the second clock signal, and thereafter is sequentially output in accordance with a third stable clock signal. As a result, for example, asynchronous noise based on a deviation between the clock on the transmission side and the clock on the receiving side is removed, and a decrease in the quality of the audio due to an unstable clock is prevented.

The oversampling unit may oversample the audio data by using a frequency obtained by multiplying the frequency of the second clock signal.

Furthermore, the oversampling unit may include a buffer for temporarily storing the oversampled audio data, and the data output unit may read the oversampled audio data from the buffer.

According to another embodiment of the present invention, there is provided an audio data receiving method including the steps of: receiving audio data sampled in accordance with a first clock signal; generating a second clock signal that is synchronized with the first clock signal by extracting clock components contained in the audio data; demodulating the audio data in accordance with the second clock signal; oversampling the demodulated audio data by using a frequency higher than a frequency of the second clock signal; generating a third clock signal having a frequency nearly equal to a frequency of the first clock signal; and outputting the oversampled audio data in accordance with the third clock signal.

According to another embodiment of the present invention, there is provided an audio data transmission and receiving system including: an audio data transmission apparatus including a transmission unit configured to transmit audio data sampled in accordance with a first clock signal; and an audio data receiving apparatus including a receiving unit configured to receive the audio data transmitted from the audio data transmission apparatus, a synchronization unit configured to generate a second clock signal synchronized with the first clock signal by extracting clock components contained in the audio data, a demodulator configured to demodulate the audio data in accordance with the second clock signal, an oversampling unit configured to oversample the audio data demodulated by the demodulator by using a frequency higher than a frequency of the second clock signal, a clock generator configured to generate a third clock signal having a frequency nearly equal to a frequency of the first clock signal, and a data output unit configured to output the audio data oversampled by the oversampling unit in accordance with the third clock signal generated by the clock generator.

As has been described above, according to the audio data receiving apparatus, the audio data receiving method, and the audio data transmitting and receiving system in accordance with embodiments of the present invention, it is possible to suppress a decrease in the quality of audio on a receiving side in a case where audio data is to be transmitted among a plurality of apparatuses.

BRIEF DESCRIPTION OF THE DRAWINGS

FIG. 8 is a block diagram showing an example of the configuration of a receiving apparatus that operates in a synchronous mode.

DESCRIPTION OF THE PREFERRED EMBODIMENTS

Figure 1:
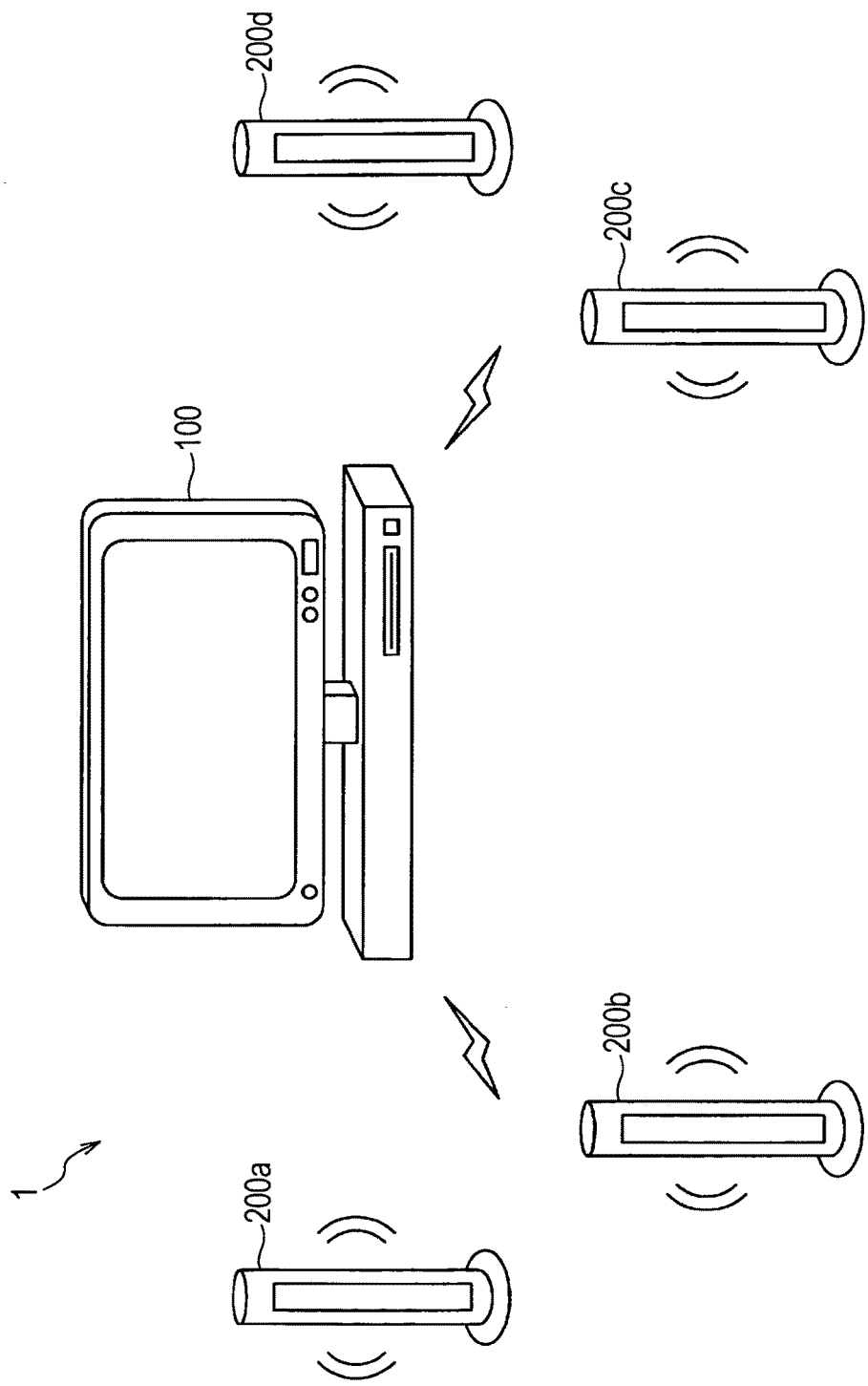
FIG. 1 is a schematic view showing the overview of an audio data transmission and receiving system according to an embodiment of the present invention.

Preferred embodiments of the present invention will be described in detail below with reference to the attached drawings. Components in the present specification and the drawings, which have substantially the same functional configurations, are designated with the same reference numerals, and repeated description thereof is omitted.

The "embodiments of the present invention" will be described in the following order.

1. Overview of System
1-1. Example of System Configuration
1-2. Description of Technology Related to the Present Invention
2. Description of Embodiment
2-1. Example of Configuration of Transmission Apparatus
2-2. Example of Configuration of Receiving Apparatus
3. Summary 1. Overview of System
1-1. Example of Configuration of System FIG. 1 is a schematic view showing the overview of an audio data transmission and receiving system 1 according to an embodiment of the present invention. Referring to FIG. 1, the audio data transmission and receiving system 1 includes a transmission apparatus 100 and receiving apparatuses 200a, 200b, 200c, and 200d.

The transmission apparatus 100 is an apparatus that reads audio data from a recording medium such as a CD, a DVD, or a blu-ray disc (BD) (registered trademark), or receives audio data from another communication apparatus and thereafter transmits the audio data in accordance with a predetermined communication method. In an example of FIG. 1, a television receiver is shown as an example of the transmission apparatus 100. However, the transmission apparatus 100 is not limited to such an example. For example, the transmission apparatus 100 may be any apparatus that handles audio data as digital data, such as a music player, a game machine, a personal computer (PC) or a telephone terminal. Furthermore, the connection method between the transmission apparatus 100 and the receiving apparatuses 200a, 200b, 200c, and 200d may be a wired connection or a wireless connection.

The receiving apparatuses 200a, 200b, 200c, and 200d are each an apparatus that receives and processes audio data transmitted from the transmission apparatus 100. In the example of FIG. 1, speakers are shown as examples of the receiving apparatuses 200a, 200b, 200c, and 200d. However, the receiving apparatuses 200a, 200b, 200c, and 200d are not limited to such examples and, for example, may be one of the apparatuses shown as an example in association with the transmission apparatus 100. Furthermore, the number of receiving apparatuses may be any number. In the subsequent description of the present specification, in a case where it is not particularly necessary to individually discriminate the receiving apparatuses 200a, 200b, 200c, and 200d, these will be collectively referred to as a receiving apparatus 200.

Here, the audio data transmitted from the transmission apparatus 100 to the receiving apparatus 200 is data sampled in accordance with a clock having a predetermined frequency. The predetermined frequency is also called a sampling frequency and, for example, the sampling frequency used in a music CD is 44.1 kHz. Furthermore, in mpeg audio layer-3 (MP3) which is one of the standard of the file format of digital audio, one of the sampling frequencies selected from candidates, such as 32 kHz, 44.1 kHz, and 48 kHz, can be used. Therefore, it is preferable that the receiving apparatus 200 receiving such audio data process the received audio data in accordance with a clock matching the sampling frequency of the audio data (for example, a demodulation process or a DA conversion process). However, in a case where the transmission apparatus 100 differs from the receiving apparatus 200, it is difficult to use a clock that completely matches between both the apparatuses. Therefore, in such an audio data transmission and receiving system, how audio data is processed with the clock being made to match between the transmission apparatus and the receiving apparatus is a problem.

1-2. Description of Technology Related to the Present Invention

Figure 7:
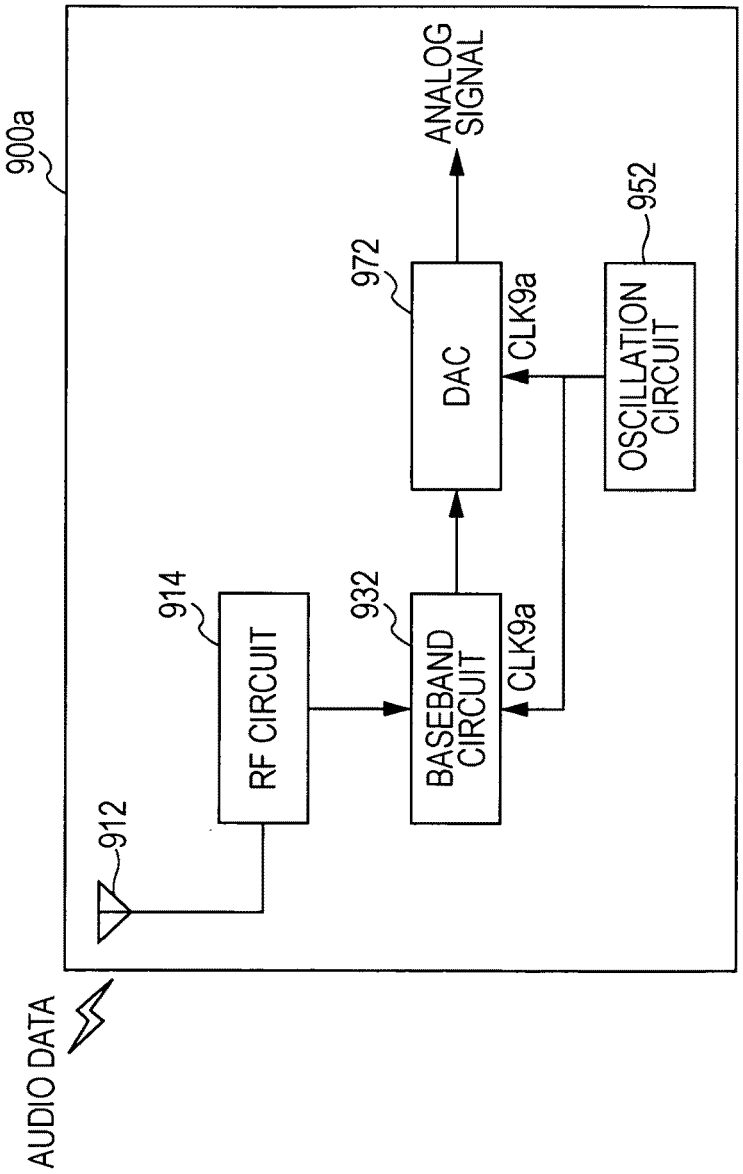
FIG. 7 is a block diagram showing an example of the configuration of a receiving apparatus that operates in an asynchronous mode.

For example, as a technique for making a clock used for processing of audio data on a receiving side match a sampling frequency on a transmission side, mainly, one of a synchronous mode and an asynchronous mode is used. FIG. 7 is a block diagram showing an example of the configuration of a receiving apparatus 900a that operates in the asynchronous mode.

In the receiving apparatus 900a shown in FIG. 7, first, an RF circuit 914 amplifies a radio signal received via an antenna 912 and converts the radio signal into a baseband signal. Furthermore, an oscillation circuit 952 generates a clock signal CLK9a having a frequency equal to the sampling frequency on the transmission side, and supplies the generated clock signal CLK9a to a baseband circuit 932 and a digital-to-analog convertor (DAC) 972. The baseband circuit 932 demodulates the baseband signal in accordance with the clock signal CLK9a, and outputs audio data. Then, the DAC 972 converts the audio data from a digital signal into an analog signal in accordance with the clock signal CLK9a, and outputs the signal to an analog circuit (not shown). The clock signal CLK9a used in such a process on the receiving side is generated by an oscillation circuit 952 by using, for example, a crystal oscillator in which an error is comparatively small. However, in that case, also, a shift of a certain degree, that is, a deviation, corresponding to, for example, an individual difference in oscillators can exist between the frequency of the clock signal CLK9a on the receiving side and the sampling frequency on the transmission side. Such a deviation in the clock between the transmission side and the receiving side in the asynchronous mode can be sensed by a user as asynchronous noise in the audio that is reproduced finally.

FIG. 8 is a block diagram showing an example of the configuration of a receiving apparatus 900b that operates in the synchronous mode. In the receiving apparatus 900b shown in FIG. 8, first, the RF circuit 914 amplifies a radio signal received via the antenna 912 and converts the radio signal into a baseband signal. Furthermore, a PLL circuit 922 extracts the clock components contained in the baseband signal, generates a clock signal CLK9b, and supplies the generated clock signal CLK9b to a baseband circuits 934 and a DAC 974. The baseband circuit 934 demodulates and expands the baseband signal in accordance with the clock signal CLK9b, and outputs audio data. Then, the DAC 974 converts the audio data from a digital signal to an analog signal in accordance with the clock signal CLK9b, and outputs the analog signal to an analog circuit (not shown). The clock signal CLK9b used for such a process on the receiving side is generated in the PLL circuit 922 in accordance with the clock components contained in the audio data that is sampled on the transmission side. Therefore, the clock signal CLK9b may become unstable depending on the performance of the PLL circuit 922, influence of noise contained in the received signal, and the like. For this reason, there is a case in which a decrease in the quality, such as jitter, is sensed in audio that is reproduced after processing in the synchronous mode.

In order to deal with such problems in the related technology, the transmission apparatus 100 and the receiving apparatus 200 according to the present embodiment suppress a decrease in audio quality on the receiving side after audio data is transmitted by using a new configuration to be described in the next section.

2. Description of Embodiment

2-1. Example of Configuration of Transmission Apparatus

Figure 2:
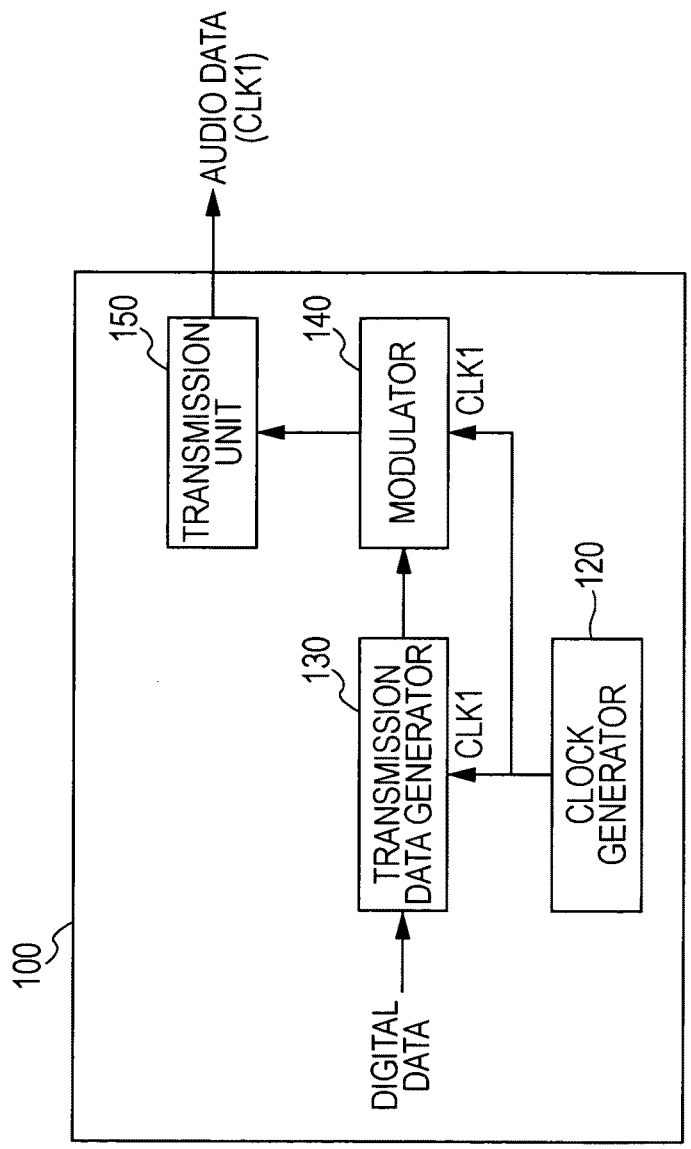
FIG. 2 is a block diagram showing an example of the logical configuration of a transmission apparatus according to an embodiment of the present invention.
Figure 3:
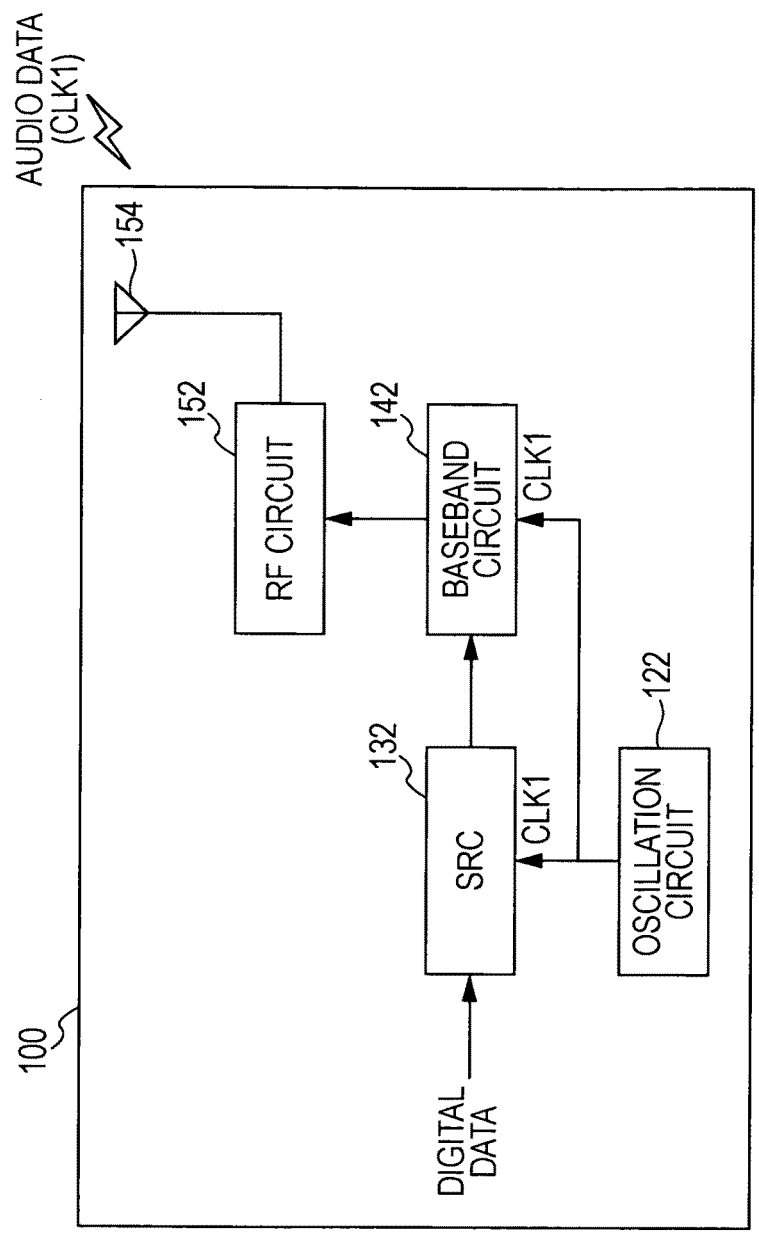
FIG. 3 is a block diagram showing an example of the physical configuration of a transmission apparatus according to an embodiment of the present invention.

FIG. 2 is a block diagram showing an example of the logical configuration of the transmission apparatus 100 according to the present embodiment. FIG. 3 is a block diagram showing an example of the physical configuration of the transmission apparatus 100 shown in FIG. 2. Referring to FIG. 2, the transmission apparatus 100 includes a clock generator 120, a transmission data generator 130, a modulator 140, and a transmission unit 150.

The clock generator 120 generates a clock signal CLK1 having a predetermined sampling frequency by using an oscillation circuit 122 shown in FIG. 3. The frequency (that is, the sampling frequency) of the clock signal CLK1 may be, for example, any frequency, such as 44.1 kHz or 48 kHz. Then, the clock generator 120 supplies the generated clock signal CLK1 to the transmission data generator 130 and the modulator 140. The oscillation circuit 122 shown in FIG. 3 may be, for example, a crystal oscillator (XO) or a voltage-controlled crystal oscillator (VCXO). In a case where the frequency of the clock signal CLK1 is a fixed value, preferably, a crystal oscillator is used as the oscillation circuit 122.

The transmission data generator 130 generates audio data that is sampled in accordance with the clock signal CLK1 supplied from the clock generator 120. For example, the transmission data generator 130 may generate audio data to be transmitted to the receiving apparatus 200 by converting the sampling rate of the audio data received from another communication apparatus by using a sampling rate convertor (SRC) shown in FIG. 3. Then, the transmission data generator 130 outputs the generated audio data to the modulator 140.

By using the baseband circuit 142 shown in FIG. 3, the modulator 140 modulates the audio data input from the transmission data generator 130 in accordance with the clock signal CLK1 supplied from the clock generator 120. At this time, in addition to the data of the audio itself, clock components having a frequency to be used for processing of such audio is contained in the audio data that is modulated by the modulator 140. Then, the modulator 140 outputs the modulated audio data to the transmission unit 150.

By using a radio frequency (RF) circuit 152 shown in FIG. 3, the transmission unit 150 frequency-converts and amplifies the audio data input from the modulator 140, and transmits the audio data as a radio signal via an antenna 154. The audio data that is transmitted here is received by, for example, the receiving apparatus 200 to be described next.

2-2. Example of Configuration of Receiving Apparatus

Figure 4:
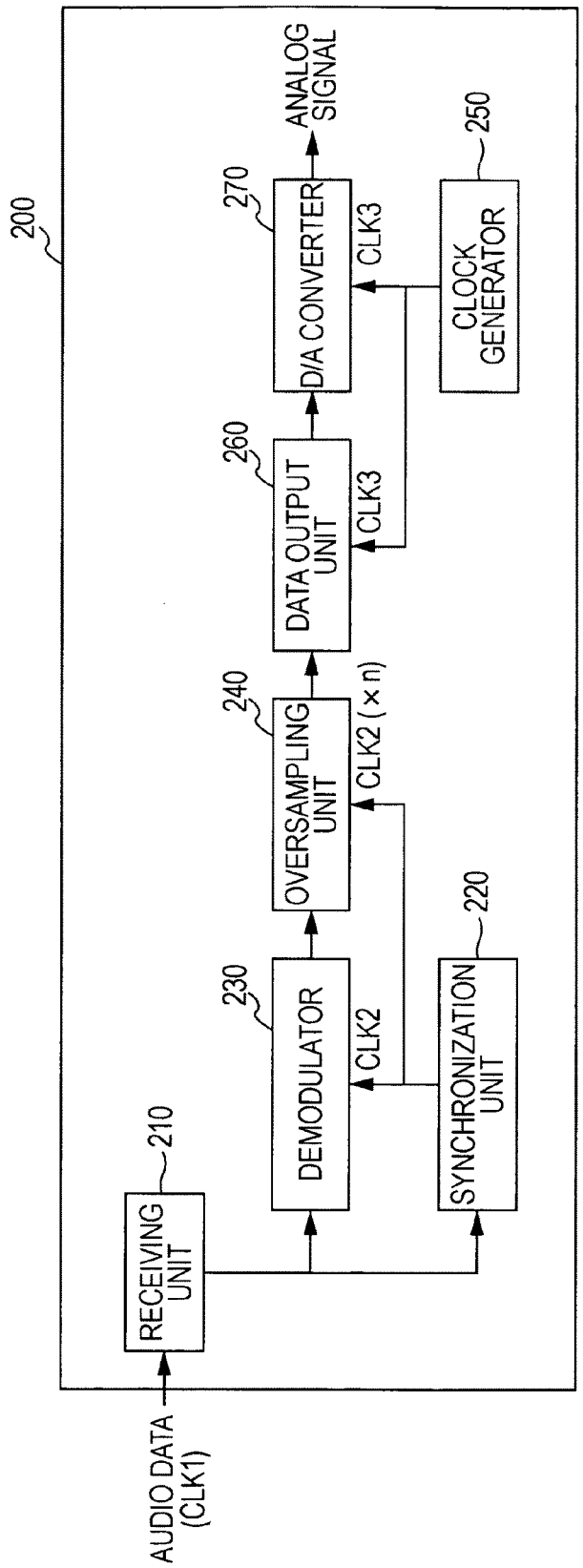
FIG. 4 is a block diagram showing an example of the logical configuration of a receiving apparatus according to an embodiment of the present invention.
Figure 5:
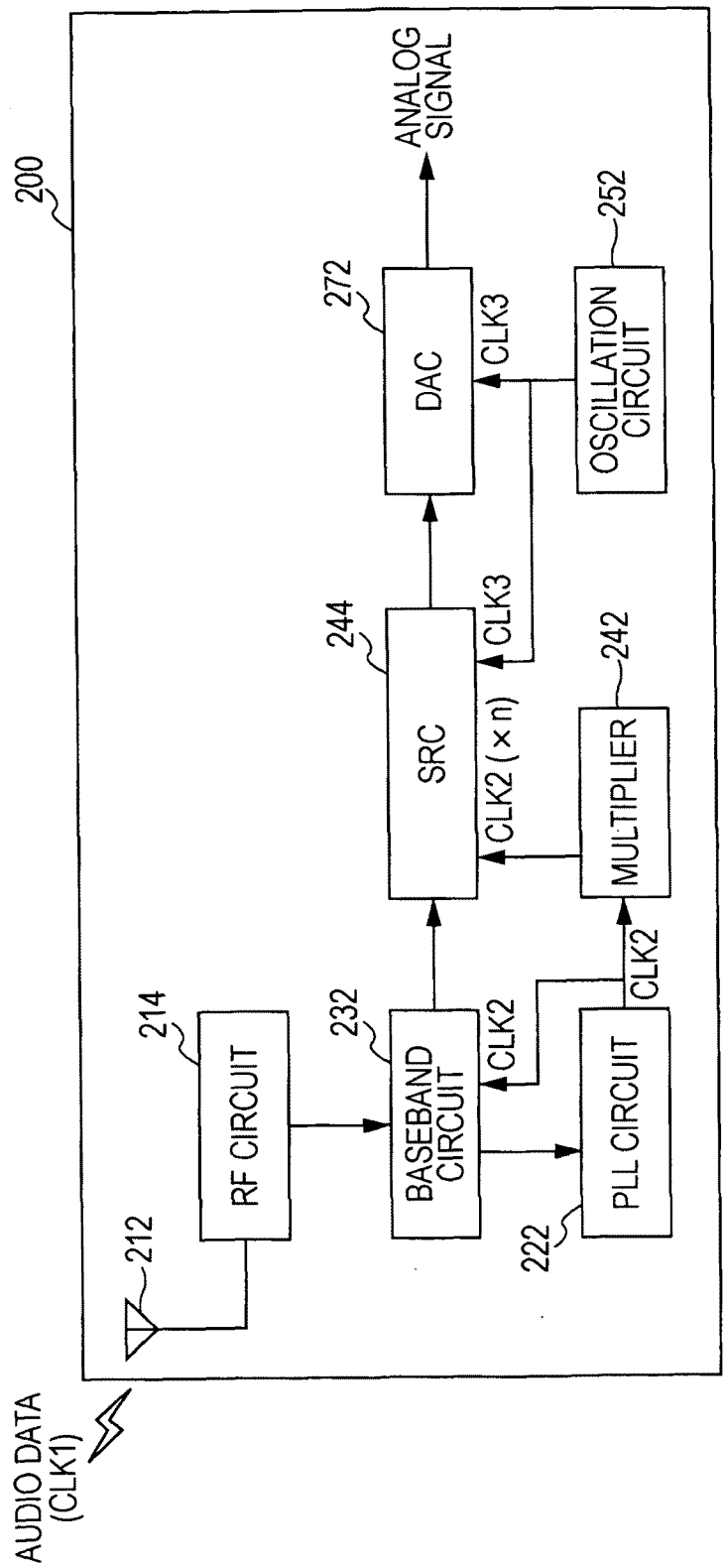
FIG. 5 is a block diagram showing an example of the physical configuration of a receiving apparatus according to an embodiment of the present invention.

FIG. 4 is a block diagram showing an example of the logical configuration of the receiving apparatus 200 according to the present embodiment. FIG. 5 is a block diagram showing an example of the physical configuration of the receiving apparatus 200 shown in FIG. 4. Referring to FIG. 4, the receiving apparatus 200 includes a receiving unit 210, a synchronization unit 220, a demodulator 230, an oversampling unit 240, a clock generator 250, a data output unit 260, and a DA converter 270.

The receiving unit 210 receives, via an antenna 212 shown in FIG. 5, audio data transmitted as a radio signal from the transmission apparatus 100, that is, audio data sampled in accordance with the clock signal CLK1. Then, by using an RF circuit 214 shown in FIG. 5, the receiving unit 210 amplifies the received radio signal, converts the radio signal into a baseband signal, and outputs the baseband signal to the synchronization unit 220 and the demodulator 230.

By using the PLL circuit 222 shown in FIG. 5, the synchronization unit 220 extracts clock components contained in the baseband signal that is input from the receiving unit 210, and generates a clock signal CLK2. That is, the clock signal CLK2 has a sampling frequency synchronized with the clock signal CLK1 that is generated by the clock generator 120 of the transmission apparatus 100. Then, the synchronization unit 220 supplies the generated clock signal CLK2 to the demodulator 230 and the oversampling unit 240.

By using the baseband circuit 232 shown in FIG. 5, the demodulator 230 demodulates the baseband signal input from the receiving unit 210 in accordance with the clock signal CLK2 supplied from the synchronization unit 220. Then, the demodulator 230 outputs the audio data as a demodulated digital signal to the oversampling unit 240.

By using a sampling frequency higher than the frequency of the clock signal CLK2, the oversampling unit 240 oversamples the audio data demodulated by the demodulator 230. More specifically, for example, the oversampling unit 240 obtains a clock having a sampling frequency such that the frequency of the clock signal CLK2 is multiplied by n times (n is an integer greater than 1) by multiplying the clock signal CLK2 supplied from the synchronization unit 220 by using a multiplier 242 shown in FIG. 5. Then, by using an SRC 244 shown in FIG. 5, the oversampling unit 240 oversamples the audio data in accordance with a sampling frequency n times the frequency of the clock signal CLK2. For example, in a case where the frequency (≈frequency of the clock signal CLK1) of the clock signal CLK2 is 48 kHz, the audio data may be oversampled by using a frequency of one of 12 to 48 MHz in which such a frequency is multiplied in a range of n=256 to 1024. Even though the higher the frequency used for oversampling, the higher the possibility that satisfactory audio is obtained finally, the circuit scale necessary for processing increases. For this reason, the value of n is preferably determined by considering the balance between the quality of the audio and the cost of the circuit. The oversampling unit 240 sequentially writes the audio data that is oversampled in the manner described above in, for example, a buffer provided inside the SRC 244.

By using the oscillation circuit 252 shown in FIG. 5, the clock generator 250 generates a clock signal CLK3 having a frequency nearly equal to the clock signal CLK1 generated by the clock generator 120 of the transmission apparatus 100. For example, in a case where the frequency of the clock signal CLK1 is 48 kHz, the clock generator 250 also generates a clock signal CLK3 having a frequency of 48 kHz. However, in such a case, also, note that a deviation occurs between the clock signal CLK1 and the clock signal CLK3 due to an individual difference in the oscillation circuit. Then, the clock generator 250 supplies the generated clock signal CLK3 to the data output unit 260 and the DA converter 270.

The data output unit 260 obtains the audio data oversampled by the oversampling unit 240 in accordance with the clock signal CLK3 supplied from the clock generator 250, and outputs the audio data to the DA converter 270. More specifically, the data output unit 260 may sequentially read each audio data item in accordance with the clock signal CLK3 from, for example, the SRC 244 in which the audio data written by the oversampling unit 240 is temporarily stored in an internal buffer. Processing via the buffer in the receiving apparatus 200 will be further described later.

By using the DAC 272 shown in FIG. 5, the DA converter 270 converts the audio data output from the data output unit 260 into an analog signal in accordance with the clock signal CLK3 supplied from the clock generator 250. Such an analog signal is reproduced, for example, as audio after the analog signal is amplified by an analog circuit (not shown).

Figure 6:
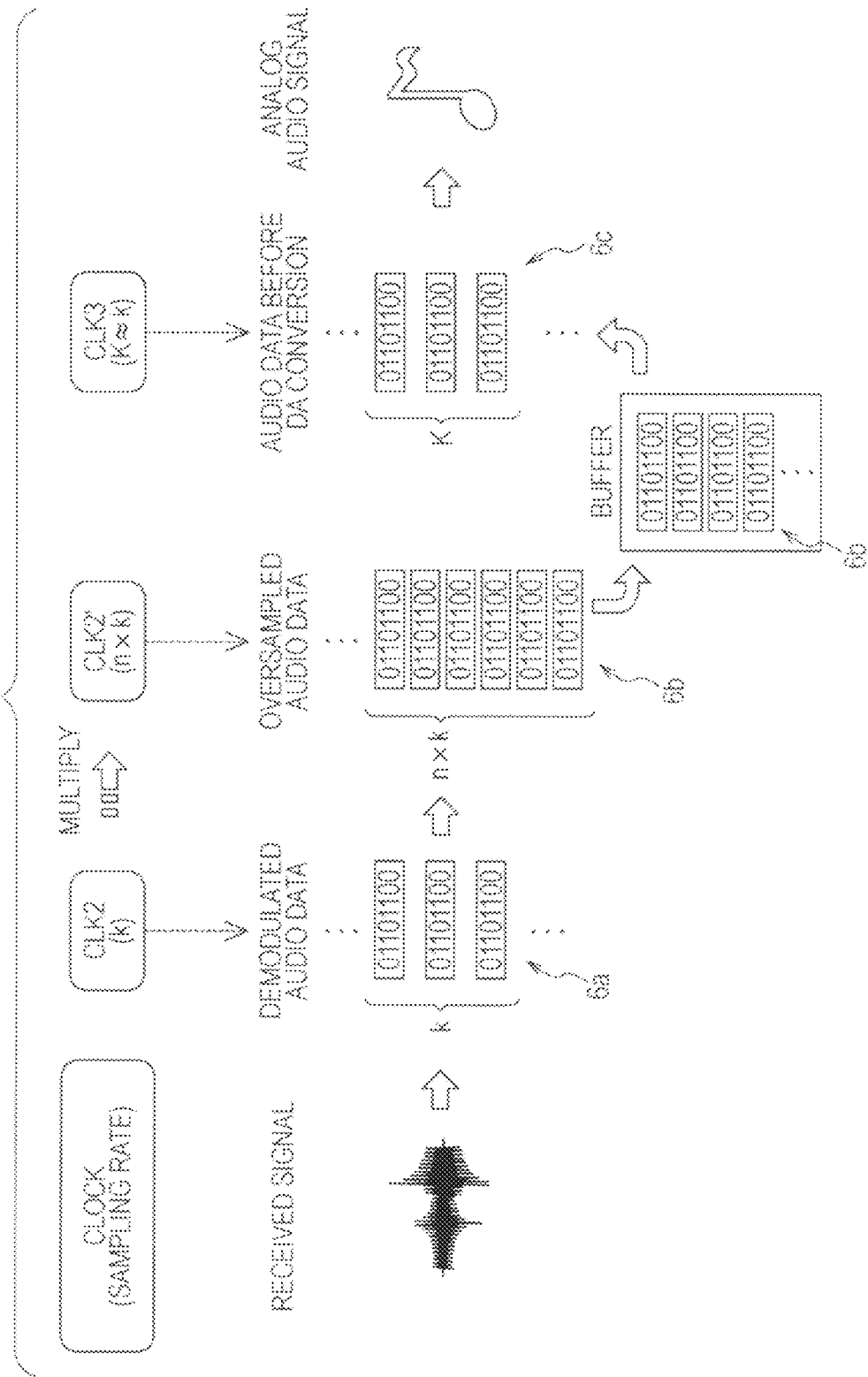
FIG. 6 is an illustration illustrating an oversampling process according to an embodiment of the present invention.

FIG. 6 is an illustration further illustrating an oversampling process using a buffer according to the present embodiment.

Referring to FIG. 6, the audio data contained in the received signal is demodulated in accordance with the clock signal CLK2 (see part 6a). The frequency of the clock signal CLK2 is synchronized with a sampling frequency k in the transmission apparatus 100. However, for example, the clock signal CLK2 is a signal that can become unstable depending on the performance of the PLL circuit 222 and noise contained in the received signal.

After that, the demodulated audio data is oversampled (see part 6b) by using a frequency n×k in which the frequency k of the clock signal CLK2 is multiplied. There is a possibility that the audio data at this point in time has a decrease in quality based on an unstable clock. Then, the oversampled audio data is written in the buffer.

Next, the audio data written in the buffer is read in accordance with the clock signal CLK3 (see part 6c). The audio data in the buffer has been oversampled, and has data that is more detailed in the time direction than the original audio data. Therefore, in a case where audio data inside a buffer is to be read in accordance with the clock signal CLK3 that is asynchronous with the clock signal CLK1 (and the clock signal CLK2 in synchronization with the clock signal CLK1) on the transmission side, an occurrence of asynchronous noise due to a deviation between the clock signal CLK1 and the clock signal CLK3 is suppressed. Such a clock signal CLK3, as described above, has a stable frequency generated by the oscillation circuit 252 (for example, XO or VCXO) of the receiving apparatus 200. For this reason, a decrease in the quality of the audio due to an unstable clock in a case where audio data is to be processed in the synchronous mode is suppressed. Then, the audio data read in accordance with the clock signal CLK3 is provided finally as an analog signal.

3. Summary

In the foregoing, the transmission apparatus 100, the receiving apparatus 200, and the audio data transmission and receiving system 1 according to the embodiments of the present invention have been described with reference to FIG. 1 to FIG. 8. According to the present embodiment, audio data is output in accordance with the clock signal CLK3 that is stably supplied in the receiving apparatus 200. Furthermore, a deviation between the clock on the transmission side and the clock on the receiving side is absorbed by the oversampling process and the buffer. For this reason, an occurrence of jitter or the like due to an unstable clock in the audio data after the audio data is transmitted from the transmission apparatus 100 to the receiving apparatus 200 can be prevented, and asynchronous noise can be removed. As a result, the quality of audio sensed by the user becomes satisfactory.

In this specification, the configuration of the transmission apparatus 100 and the configuration of the receiving apparatus 200 have been separately described. However, a communication apparatus including the functions of both the transmission apparatus 100 and the receiving apparatus 200 may be provided. In such a case, for example, by sharing the SRC 132 shown in FIG. 3 and the SRC 244 shown in FIG. 5, it is possible to suppress an increase in the overall circuit scale of the apparatus and reduce the cost.

Although the preferred embodiments of the present invention have been described while referring to the attached drawings, the present invention is not limited to such embodiments. It is obvious that a person skilled in the art can conceive various changes or modifications within the scope of the technical concept described in the claims, and it should be understood that the various changes or modifications naturally fall within the technical scope of the present invention.

It should be understood by those skilled in the art that various modifications, combinations, sub-combinations and alterations may occur depending on design requirements and other factors insofar as they are within the scope of the appended claims or the equivalents thereof.

What is claimed is:

1. An audio data receiving apparatus comprising:
   a receiving unit configured to receive audio data sampled in accordance with a first clock signal;
   a synchronization unit configured to generate a second clock signal that is synchronized with the first clock signal by extracting clock components contained in the audio data;
   a demodulator configured to demodulate the audio data in accordance with the second clock signal;
   an oversampling unit configured to oversample the audio data demodulated by the demodulator by using a frequency which is higher than a frequency of the second clock signal and which is obtained by use of the second clock signal;
   a clock generator configured to generate a third clock signal having a frequency which is equal to a frequency of the first clock signal; and
   a data output unit configured to output the audio data oversampled by the oversampling unit in accordance with the third clock signal generated by the clock generator,
   in which the third clock signal generated by the clock generator is asynchronous with the first clock signal such that the first clock signal is not utilized to generate the third clock signal,
   wherein the oversampling unit oversamples the audio data by using a frequency obtained by multiplying the frequency of the second clock signal by n, where n is an integer between 256 and 1024, inclusive, wherein the oversampling unit has a buffer for temporarily storing the oversampled audio data, and wherein the data output unit reads the oversampled audio data from the buffer in accordance with the third clock signal.

2. An audio data receiving method comprising the steps of:

receiving audio data sampled in accordance with a first clock signal;

generating a second clock signal that is synchronized with the first clock signal by extracting clock components contained in the audio data;

demodulating the audio data in accordance with the second clock signal;

oversampling the demodulated audio data by using a frequency which is higher than a frequency of the second clock signal and which is obtained by use of the second clock signal;

generating a third clock signal having a frequency which is equal to a frequency of the first clock signal; and outputting the oversampled audio data in accordance with the third clock signal, in which the third clock signal is asynchronous with the first clock signal such that the first clock signal is not utilized to generate the third clock signal, wherein oversampling the demodulated audio data comprises oversampling the demodulated audio data using a frequency obtained by multiplying the frequency of the second clock signal by n, where n is an integer between 256 and 1024, inclusive, wherein oversampling the demodulated audio data comprises temporarily storing the oversampled audio data in a buffer, and wherein outputting the oversampled audio data comprises reading the oversampled audio data from the buffer in accordance with the third clock signal.

3. An audio data transmission and receiving system comprising:

an audio data transmission apparatus including a transmission unit configured to transmit audio data sampled in accordance with a first clock signal; and an audio data receiving apparatus including a receiving unit configured to receive the audio data transmitted from the audio data transmission apparatus, a synchronization unit configured to generate a second clock signal synchronized with the first clock signal by extracting clock components contained in the audio data, a demodulator configured to demodulate the audio data in accordance with the second clock signal, an oversampling unit configured to oversample the audio data demodulated by the demodulator by using a frequency which is higher than a frequency of the second clock signal and which is obtained by use of the second clock signal, a clock generator configured to generate a third clock signal having a frequency which is equal to a frequency of the first clock signal, and a data output unit configured to output the audio data oversampled by the oversampling unit in accordance with the third clock signal generated by the clock generator, in which the third clock signal generated by the clock generator is asynchronous with the first clock signal such that the first clock signal is not utilized to generate the third clock signal, wherein the oversampling unit oversamples the audio data by using a frequency obtained by multiplying the frequency of the second clock signal by n, where n is an integer between 256 and 1024, inclusive, wherein the oversampling unit has a buffer for temporarily storing the oversampled audio data, and wherein the data output unit reads the oversampled audio data from the buffer in accordance with the third clock signal.

* * * * *